Patented June 28, 1927.

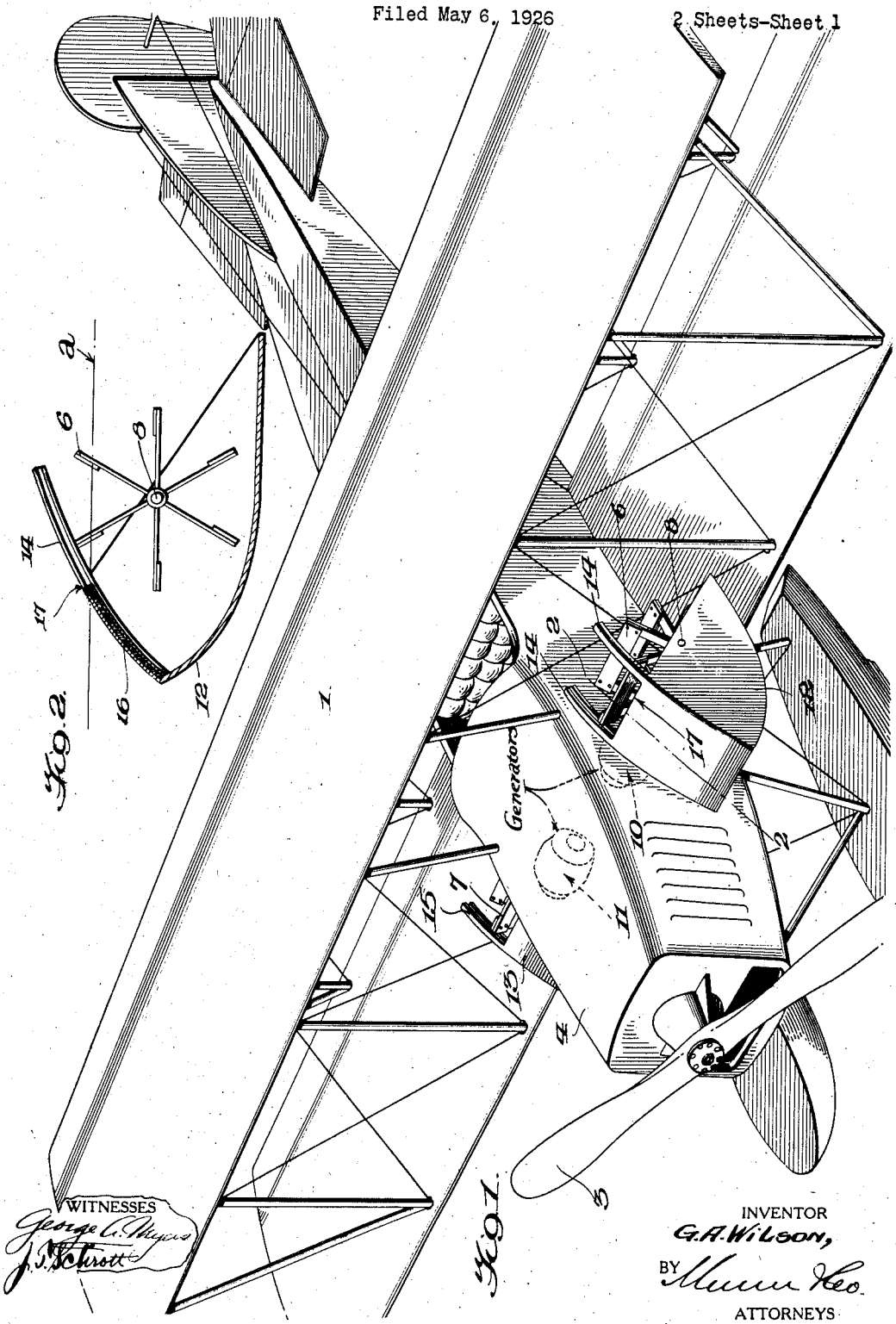

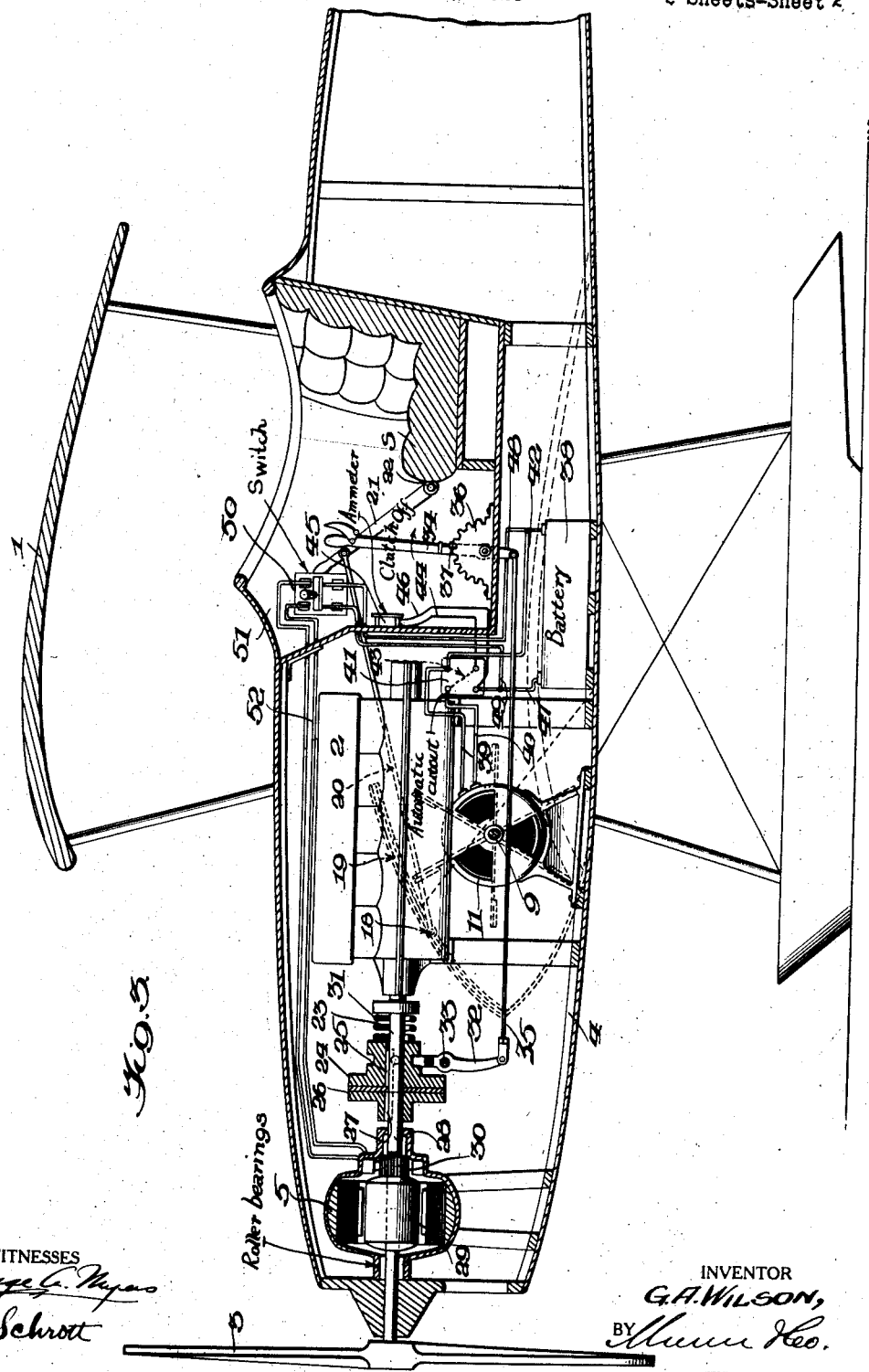

1,634,167

UNITED STATES PATENT OFFICE.

GEORGE A. WILSON, OF GREENWOOD, MISSISSIPPI.

ELECTRICAL GENERATING APPARATUS FOR AIRPLANES.

Application filed May 6, 1926. Serial No. 107,234.

This invention relates to improvements in airplanes, one of the objects being to provide apparatus capable of operation by passing air currents for the production of electricity, there being means for employing the electricity at times for the operation of the airplane propeller independently of the airplane gasoline motor.

Other objects and advantages appear in the following specification, reference being had to the accompanying drawings, in which Figure 1 is a perspective view of an airplane principally showing the wind wheels and housings.

Figure 2 is a detail sectional view taken on the line 2—2 of Figure 1,

Figure 3 is a central longitudinal section of a portion of the airplane illustrating the details of the generating apparatus.

The electrical generating apparatus is herein shown and described in connection with the airplane 1 but it is contemplated that the principles of the invention may be employed in other connections and for other purposes. Such other connections mentioned would require, as is the case of the airplane, a prime mover shown as consisting of a gasoline motor 2, a device to be driven in this case the propeller 3, a mounting which becomes movable upon operation of the driven device consisting of the fuselage 4 and a secondary mover which in this case is the electric motor 5.

An airplane is regarded as a good type of mounting for the apparatus, and perhaps may be preferable to others due to the swiftness of the air currents when the airplane flies forwardly at high velocity. The air currents are made to drive a pair of wind wheels 6 and 7 which are composed of a familiar arrangement of radial spokes having transverse paddles fastened to the extremities. The wind wheels are mounted upon shafts 8 and 9. Each of the shafts operates an electrical generator. The generators 10 and 11 are generally indicated in Figure 1 and the generator 11 is more plainly shown in Figure 3.

These wind wheels are contained by housings 12 and 13, mounted in any suitable manner at the sides of the fuselage 4. The stream line construction of the windwheel housing is preferable to present as little resistance as possible to the forward passage of the airplane. The windwheel shafts are journaled in any suitable manner between the sides of the fuselage and the housings themselves.

It is not intended that the wind wheels shall revolve perpetually while the airplane is in motion, although they may be made to do so if desired. To carry out the purpose of rendering the wind wheels operative or inoperative the housings are provided with guides 14 and 15 (Fig. 1) in which the lateral extremities or edges of articulated hoods or covers 16 (Fig. 2) are capable of sliding. The end 17 of the housing (using the housing 12 as an example) falls on a line (Fig. 2) a suitable distance below the upper extremity of the wind wheel 6. Thus, when the hood 16 is let down into the front part of the housing 12 the air currents will have free play upon the exposed paddles. The reverse is true when the hood is drawn to the other extremity of the guides 14. The windwheel will then be covered and not being subject to the air currents will remain still.

Operation of the hoods is conveniently performed from the aviator's seat S. Figure 3 illustrates the operating means of the hood on the far side. The hood will be provided with a pin 18 extending through an arcuate slot 19 in the side of the fuselage. A link 20 connects the pin with a handle 21 which in turn is pivoted at 22 to a suitable support. It is plain that movement of the handle forward and backward upon its pivot will depress or extend the hood of the housing 13 either to a concealed or an exposed position thereby to either permit or prevent rotation of the wind wheel 7. There will be a similar arrangement for the operation of the cover 15 of the housing 12. Usually both hoods will be let down together so that both windwheels will operate simultaneously. But inasmuch as there is no connection between the two, it is permissible to operate one without the other.

Reference is had to Figure 3. The gasoline motor 2 is regarded as being of any ordinary kind, and inasmuch as such motors are of more or less common knowledge, the usual gasoline supply, carbureting device, controls, etc. are omitted. The gasoline motor or prime mover shaft 23 is extended at the front to carry the element 24 of a clutch which is revoluble with the shaft but axially slidable upon a key 25. The complementary element 26 of the clutch is fixedly keyed at 27 upon the rearward extension of the electric motor or secondary mover shaft 28. The forward extension of this shaft carries the propeller 3. The shaft also carries the usual armature and commutator 29 and 30. A sufficiently powerful spring 31, mounted upon the shaft 23 behind the movable clutch element normally forces that element into engagement with the element 26 so that operation of the gasoline motor 2 will drive the propeller 3.

Under this circumstance the armature 29 and commutator 30 will obviously revolve with the propeller or secondary mover shaft 28. Although this circumstance is mentioned it is of no consequence. A lever 32, pivoted at 33 and having forked engagement with the movable clutch element 24, is capable of disengaging the movable element when the gasoline motor 2 is to be disconnected from driving engagement. A lever 34, accessible by the aviator, permits operation of the clutch lever 32. A rod 35 connects the two levers. A conventional quadrant 36 and detent 37 hold whatever adjustment may be made of the lever 34.

The electrical portion of the apparatus comprises a storage battery 38 (Fig. 3) which is capable of being charged by the two generators. Only the generator 11 is shown in circuit in Figure 3 but in practice the generator 10 will be connected in the circuit in parallel so that both may act upon the battery. Feed wires 39 and 40 of the generator 11 connect with two of the terminals of an automatic cut-out 41. The continuation 42 of the wire 39 connects with one terminal of the battery. The continuation 43 of the wire 40 through the cut-out 41 connects with a wire 44 which extends to a conventional ammeter 45. The two remaining terminals of the automatic cut-out serve first for the double connection of the wires 43 and 44 and second for the connection of wires 46, and 47 respectively from the ammeter and from the remaining terminal of the battery 38.

Branches 48 and 49 of the battery wires 42 and 47 connect with the blades of a switch 50 whence they continue as wires 51 and 52 to suitable terminals of the electric motor 5. Closing and opening of the switch 50 will start and stop the motor 5, the current being supplied by the battery 38. The automatic or reverse-current cut-out 41 is of the conventional type commonly used in automobiles, for example the Dodge automobile. A synopsis of the description of operation of the cut-out is contained in Dykes Automobile and Gasoline Engine Encyclopedia of 1918, page 370 is as follows: A given generator speed will cause closure of the circuit between the generator and the battery thus allowing a charging current to be conducted from the generator to the battery. Whenever the speed falls below the predetermined amount the cut-out automatically opens the circuit preventing a discharge of the battery back through the generator.

The operation is readily understood. The gasoline motor 2 is set in operation to revolve the propeller 3 to raise the airplane 1 to the desired height. The clutch 24, 26 must be engaged so that the two motor shafts 23 and 28 will operate as one.

After the desired speed of the airplane is obtained the hoods 16, which up to this time were supposed to be drawn rearwardly in the guides 14 and 15 over the wind wheels 6 and 7, are now let down into the concealed position, thereby exposing the upper extremities of the wind wheels to the air currents which strike upon the line $a$ in Fig. 2. Both the driving force of the air currents and the momentum of the wheels themselves will set them to and keep them revolving at a high rate. The generator 10 and 11, connected with the wind wheel shafts send an electric current into the battery 38 over a circuit supposedly completed through the cut-out 41 as follows: generator 11 (see Fig. 3) over wires 39 and 42 to the battery 38, over wires 47 and 46 to the ammeter 45, returning over wires 44, 43 and 40 to the generator. The capacity of the storage battery 38 may be as great as desired.

At a given time the aviator may stop the gasoline motor 2 and in the same instance both disengage the clutch and close the switch 51. The action within the battery 38 then sets up a current as follows: one terminal of the battery over wire 48 to the switch 50, wire 51 to the motor 5, returning by way of wire 52 to the switch and wires 49 and 47 to the other terminal of the battery. The electric motor 5 thus acts in substitution for the gasoline motor 2. It is an assistant mover, and may be cut in or out as conditions may warrant.

Forward motion of the airplane at characteristic high speed will keep the wind wheels 6 and 7 turning. The operation of the generators and storing of current is therefore continuous. Electrical propulsion of the propeller 3 may therefore be continued over an extended period with the added advantage of quiet operation and elimination of danger by fire or failure of motive power.

Gasoline motor 2 may be started and caused to drive the propeller 3 as easily as it can be stopped. It is not an uncommon occurrence that a gasoline airplane motor will stop (or "die" as it is commonly called) while the airplane is in flight. At such times, it requires a cool head to bring the airplane to the ground safely. But with an auxiliary source of power at his command the aviator in the present instance could switch on the motor 5 and thereby save himself possible disaster.

With the acquired understanding of the construction and operation of the apparatus, the reader can comprehend the foregoing reservation of use of the invention in connections other than with an airplane. The requisite of such use would be some type of propeller which, by virtue of its operation, would cause movement of its mounting. The prime mover of the propeller can be substituted for at times by a secondary mover which is dependent for its power on the action of the movable mounting. Therefore, while the construction and arrangements of the apparatus is that of a generally preferred form, obviously modifications and changes may be made without departing from the spirit of the invention or the scope of the claims.

I claim:—

1. A prime mover comprising a gasoline motor having a crank shaft, a secondary mover comprising an electric motor having an armature shaft, a device to be driven being mounted upon the armature shaft, a mounting for the foregoing structures being set in motion by operation of said device, means operated by the motion of the mounting for generating and storing electrical current, a circuit embracing the electric motor and the current storage, said circuit having a switch capable of closure to operate the electric motor, and a clutch with an operating control therefor, having elements mounted upon continuous ends of said shafts permitting variable operation of said device by either the primary or secondary mover.

2. In combination with a body to be propelled, a device to be driven and thereby secure the required propulsion, a prime mover with characteristic controls therefor, a secondary mover comprising an electric motor, means acted upon by the medium through which the body is propelled to produce an electrical current, a battery in which the current is stored, a circuit embracing the motor and battery including a switch by which the circuit can be opened and closed, and means for optionally confining the driving effort of said device to either the primary or secondary movers in which latter instance the switch is closed, confining the driving effort to the prime mover in which the switch is opened, or distributing the driving effort between both movers in which case the switch is closed.

3. In combination with a body to be propelled, a device to be driven thereby securing said propulsion, a prime mover with characteristic controls therefor, a secondary mover comprising an electric motor, a wheel which may be subjected to the action of the medium through which the body is to be propelled, a housing for the wheel having a hood which may be placed in position to either cover or expose a portion of the wheel to said medium, a generator operated by the wheel when said portion is exposed and when the body is in motion by means of said medium, a battery in which chemical action is set up by operation of the generator, a circuit embracing the battery and electric motor having a switch capable of being closed and opened, and a clutch between the prime and secondary movers being operable for the purpose described.

4. An airplane having a fuselage, a propeller, a gasoline motor for driving the propeller, an electric motor having an armature shaft upon which the propeller is mounted, housings at the sides of the fuselage having a slidable hood, a wind wheel in each of the housings being exposed or protected from the wind according to the position of the hood, generators operated by the wind wheel, an electrical circuit including the generators and the electric motor, said circuit containing a battery and a switch the latter being closed to operate the electric motor from the battery, a clutch comprising fixed and slidable elements respectively upon the contiguous ends of the armature and the gasoline motor shafts, and means for operating the movable elements to either release or connect the gasoline motor as may be desired.

5. A device of the character described comprising a prime mover having a shaft, a secondary mover comprising an electric motor having a shaft, a device to be driven being mounted upon the shaft of the secondary mover, a mounting for the foregoing structure being set in motion by operation of said device, means operated by the motion of the mounting for generating and storing electrical current, a circuit embracing the electric motor, and the current storage means, said circuit having a switch capable of closure to operate the electric motor, and a clutch with an operating control therefor, having elements mounted upon said shafts permitting variable operation of said device by either the primary or secondary mover.

GEORGE A. WILSON.